US005669381A

United States Patent [19]

Hyatt

[11] Patent Number: 5,669,381

[45] Date of Patent: Sep. 23, 1997

[54] ELECTRICAL OVERSTRESS PULSE PROTECTION

[75] Inventor: Hugh M. Hyatt, Camarillo, Calif.

[73] Assignee: G & H Technology, Inc., Camarillo, Calif.

[21] Appl. No.: 612,432

[22] Filed: Nov. 14, 1990

Related U.S. Application Data

[63] Continuation of Ser. No. 273,020, Nov. 18, 1988, Pat. No. 4,992,333.

[51] Int. Cl.$^6$ .............................. B32B 5/16; H01C 7/10; H01B 1/00

[52] U.S. Cl. .............................. 428/402; 338/20; 338/21; 252/500; 252/512; 428/329; 428/331

[58] Field of Search .............................. 428/329, 331, 428/357, 402; 338/20, 21; 361/117, 127, 431, 91; 252/511, 504, 506, 507, 512, 513, 514, 516, 518, 519, 520, 500

[56] References Cited

U.S. PATENT DOCUMENTS

| | | | |
|---|---|---|---|
| 2,796,505 | 6/1957 | Bocciarelli | 252/516 X |
| 4,097,834 | 6/1978 | Mar et al. | 252/512 X |
| 4,726,991 | 2/1988 | Hyatt et al. | 428/329 |
| 4,977,357 | 12/1990 | Shrier et al. | 252/500 X |
| 4,992,333 | 2/1991 | Hyatt | 428/402 |
| 5,068,634 | 11/1991 | Shrier | 252/512 X |

*Primary Examiner*—Newton Edwards
*Attorney, Agent, or Firm*—Boris Haskell

[57] ABSTRACT

An electrical overstress composite of conductor/semicondcutor particles including particles in the 100 micron range, micron range, and submicron range, distributed in a densely packed homogeneous manner, a minimum proportion of 100 angstrom range insulative particles separating the conductor/semiconductor particles, and a minimum proportion of insulative binder matrix sufficient to combine said particles into a stable coherent body.

7 Claims, 2 Drawing Sheets

ELECTRICAL OVERSTRESS PULSE PROTECTION

This application is a continuation of application Ser. No. 07/273,020 now U.S. Pat. No. 4,992,333, filed Nov. 18, 1988.

SUMMARY OF THE INVENTION

The present invention relates to the protection of electrical and electronic circuits from high energy electrical overstress pulses that might be injurious or destructive to the circuits, and render them non-functional, either permanently or temporarily. In particular, the invention relates to a composition and formulation of materials which can be connected to, or incorporated as part of an electrical circuit, and are characterized by high electrical resistance values when exposed to low or normal operating voltages, but essentially instantaneously switch to low electrical impedance values in response to an excessive or overstress voltage pulse, thereby shunting the excessive voltage or overstress pulse to ground.

These materials and circuit elements embodying the invention are designed to respond substantially instantaneously to the leading edge of an overstress voltage pulse to change their electrical characteristics, and by shunting the pulse to ground, to reduce the transmitted voltage of the pulse to a much lower value, and to clamp the voltage at that lower value for the duration of the pulse. The material is also capable of substantially instantaneous recovery to its original high resistance value on termination of the overstress pulse, and of repeated responses to repetitive overstress pulses. For example, the materials of the present invention can be designed to provide an ohmic resistance in the megohm range in the presence of low applied voltages in the range of 10 to more than 100 volts. However, upon the application of a sudden overstress pulse of, for example, 4,000 volts, the materials and circuit elements of the invention essentially instantaneously drop in resistance, and within a nanosecond or two of the occurrence of the leading edge of the pulse, switch to a low impedance shunt state that reduces the overstress pulse to a value in the range of a few hundred volts, or less, and clamps the voltage at that low value for the duration of the pulse. In the present description, the high resistance state is called the "off-state", and the low resistance condition under overstress is called the "on-state".

In general, the present materials constitute a densely packed intimate mixture and uniform dispersion of 100 micron range, micron range, and submicron range electrically conductive and semiconductive particles supported in fixed spaced relation to each other in an electrically insulative binder or matrix. As currently understood, these particles should embody a homogeneously dispersed mixture of particles wherein the intrinsic electrical conductivities of some of the particles are significantly disparate from others of the particles, preferably characterized as conductor and semiconductor particles. Further, as currently understood, there should be an interfacial spacing between these particles of the order of 20 to 200 angstroms, or so. In order to obtain that spacing, a small amount of 100 angstrom range insulative particles is preferably dispersed in the mixture of conductive and semiconductive particles to function as spacers. Thus, when this composite of particulate materials is densely packed, the micron range particles tend to occupy the major voids left by the closely packed 100 micron range particles, and the submicron range particles tend to occupy the lesser voids left by the closely packed micron range particles, with the 100 anstrom range insulative particles separating many of those particles. The residual voids between the particles are filled with the aforesaid electrically insulative binder or matrix, preferably a thermoset resin, although other insulative resins, rubbers and other materials can be employed.

In the above-described composite material, it is believed that an important feature in attaining the desired electrical properties is the formation of the,particulate composition into a dense and compact mass, as free of voids as possible, and wherein the particles are packed in as dense a configuration as possible and as permitted by the aforesaid spacer particles, in the manner described above. Optimumly, the density of the entire composite composition, particulate and matrix, should be within a few percent of the theoretical density for the materials used, preferably within about 1–3%, thereby attaining the interparticulate packing and spacing as above-specified over the entire volume of the composite.

As currently understood, the high ohmic resistance for the composite at low applied voltages, is obtained by the uniform conduction discontinuities or gaps between the spaced conductive/semiconductive particles, while the low resistance conductivity of the composite in response to a high voltage electrical overstress pulse, is obtained predominantly by quantum-mechanical tunneling of electrons across the same angstrom range gaps between adjacent conductive and/or semiconductive particles. Pursuant to this interpretation of the operation of the composite, the role of the insulative spacer particles and the insulative resin matrix is not to supply a high resistance material, but simply to provide non-conductive spacing between the conductive and semiconductive particles, and to bind the composite into a coherent mass. Consistent with that understanding of the invention, the volume proportion of insulative spacer particles and of insulative resin in the composite should optimumly be the minimum quantity of each consistent with obtaining the desired spacing, and consistent with imparting structural integrity to the composite. Likewise, in accordance with this understanding of the invention, it is desirable, and perhaps important to the proper functioning of the invention, that the conductive and semiconductive particles be relatively free of insulative oxides on their surfaces, because these insulative oxides only add to the interfacial spacing between the conductive/semiconductive materials of the particles, when it is important that the spacing be minimized, and they unnecessarily impede the quantum-mechanical tunneling.

When the teachings of the present invention are employed and practiced with maximum effect, one obtains an electrical overstress pulse responsive material, which, on the one hand, provides high (megohm range) resistance values to applied low voltage currents of the order of up to 100 volts, or so, but on the other hand, responds essentially instantaneously to the leading edge of an overstress voltage pulse of the order of several thousand volts or more, by becoming electronically conductive to clamp that voltage pulse within a few nanoseconds to a maximum value of several hundred volts or less and to maintain that clamp for the duration of the overstress pulse, and to return immediately to its high ohmic value on termination of the overstress pulse. By proper adjustment of the composition of the composite, desired off-state resistances and desired on-state clamping voltages can be selected as desired for a particular use or environment.

The present invention resides in the electrical overstress composite material, its composition, and its formulation. The physical structure of its use in a particular environment is not part of this invention, and such are known in the art and are readily adapted to, and designed for the specific environment of use. Obviously, as a bulk electrical resistance material, the prepared composite may be formed by compression molding in an elongate housing, and may be provided with conductive terminal end caps, as is conventional for such resistors. Alternatively, the prepared composite may be formed by conventional extrusion molding about a center conductor and encased within a conductive sheath or sleeve, so that an overstress pulse on the center conductor would be shunted through the composite to the outer sheath which, in use, would be grounded. Also, the composite may be incorporated into structural circuit elements, such as connectors, plugs and the like.

The prior art contains teachings of electrical resistance composites intended for purposes similar to that of the present invention, but they differ from the present invention and do not accomplish the same results.

U.S. Pat. No. 2,273,704 to R. O. Grisdale discloses a granular composite material having a non-linear voltage-current characteristic. This patent discloses a mixture of conductive and semiconductive granules that are coated with a thin insulative film (such as metal oxides), and are compressed and bonded together in a matrix to provide stable, intimate and permanent contact between the granules.

U.S. Pat. No. 4,097,834 to K. M. Mar et al. provides an electronic circuit protective device in the form of a thin film non-linear resistor, comprising conductive particles surrounded by a dielectric material, and coated onto a semiconductor substrate.

U.S. Pat. No. 2,796,505 to C. V. Bocciarelli discloses a non-linear precision voltage regulating element comprised of conductor particles having insulative oxide coatings thereon that are bound in a matrix. The particles are irregular in shape, and are point contiguous, i.e. the particles make point contact with each other.

U.S. Pat. No. 4,726,991 to Hyatt et al. discloses an electrical overstress protection material, comprised of a mixture of conductive and semiconductive particles, all of whose surfaces are coated with an insulative oxide film, and which are bound together in an insulative matrix, wherein the coated particles are in contact, preferably point contact, with each other.

Additional patents illustrative of the prior art in respect to this general type of non-linear resistor are U.S. Pat. No. 2,150,167 to Hutchins et al., 2,206,792 to Stalhana, and 3,864,658 to Pitha et al.

Within the teachings of the prior art, and particularly in the aforesaid Hyatt et al. patent, is the ability to create composite materials that are capable of responding substantially instanteously to an electrical overstress pulse of several thousand volts, and clamping the voltage of the pulse to a relatively low value, of several hundred volts. However, in order to attain that goal following the teachings of said Hyatt et al. patent, it is necessary to design the composite material in a manner that provides a very low resistance of only a few hundred or a few thousand ohms in the off-state. Such a device obviously would have very limited application. Following said Hyatt et al. patent teachings, if the composite composition is altered to increase the off-state resistance to the megohm range, the on-state clamping voltage in response to an electrical overstress pulse is increased to substantially over 1000 volts. This dichotomy or contradiction in results stems from the understanding expressed in said patent that high off-state resistance is a function of the inclusion of high proportions of insulation material in the composite. However, the high proportion of insulation material interferes with the quantum-mechanical tunneling effect on which the on-state low clamping voltage characteristic depends.

In accordance with the present invention, it is discovered that a consonant effect of both off-state high resistance and on-state low clamping voltage can be obtained. As currently understood, it appears that the key to these consonant effects is the presence of a minimum proportion of insulative material in the composite, including the 100 angstrom range spacer particles and binder, with a high proportion of conductive/semiconductive particles, and a densely packed, uniform, and essentially homogeneous distribution of the conductive/semiconductive components throughout the composite, with the density of the entire composite approaching the theoretical density for the materials used. It is currently believed that the consonant results are obtained under these circumstances, because: on the one hand, the conductive/semiconductive particles are in large part separated from each other by uniformly distributed insulative spacer particles, to limit or avoid long conductive chains of contiguous conductor/semiconductor particles, thereby providing the high off-state resistance; and on the other hand, the minimal quantity of uniformly distributed insulative spacer particles and of binder results in the uniform closely spaced separation of the densely packed conductor/semiconductor particles, thereby providing for efficient quantum-mechanical tunneling throughout all portions of the composite on the occurrence of an electrical overstress pulse.

It is accordingly one object of the present invention to provide a composite material that is responsive to electrical overstress pulses for protecting electrical circuits and devices.

Another object of the present invention is to provide such a composite material which provides a large ohmic resistance to normal electrical voltage values, but in response to an electrical overstress voltage pulse substantially instantaneously switches to a low impedance.

Still another object of the present invention is to provide such a composite material which, when coupled to ground, shunts the pulse to ground and clamps the overstress voltage pulse at a low value.

And still another object of the present invention is to provide such a composite material which returns to its initial state promptly after termination of the overstress voltage pulse, and will similarly respond repetitively to repeated overstress voltage pulses.

Other objects and advantages of the present invention will become apparent to those skilled in the art from a consideration of the illustrative and preferred embodiments of the invention described in the detailed description of the invention set forth below.

BRIEF DESCRIPTION OF THE DRAWINGS

The following detailed description of the invention is had in conjunction with the accompanying drawings, wherein.

DETAILED DESCRIPTION OF THE INVENTION

Figure 1:
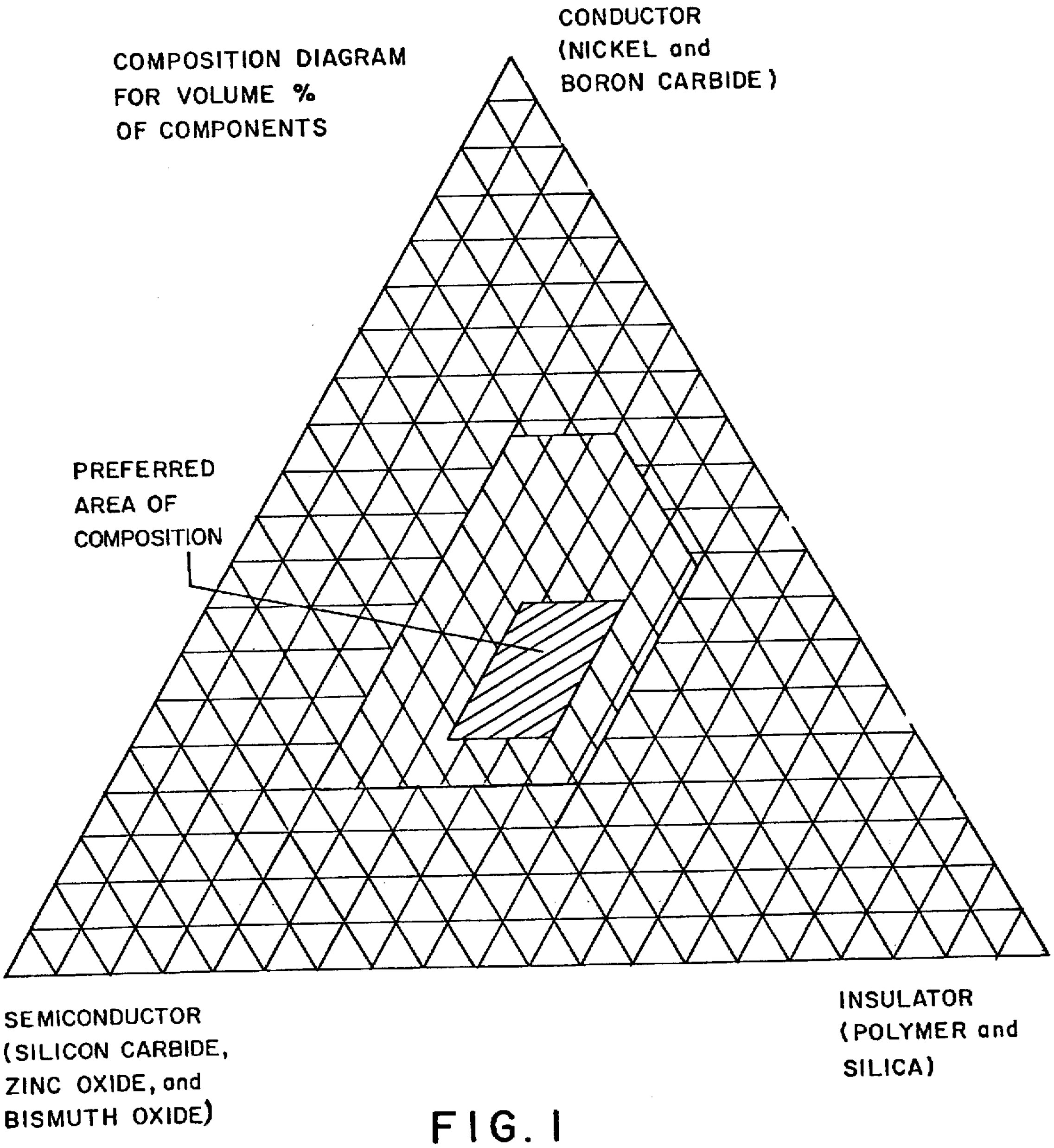
FIG. 1 is a triangular three-coordinate graph depicting the compositions of the present invention.

In the practice of the present invention, the key electrical ingredient of the composite is a mixture of conductor/ semiconductor particles, constituting from about 55 to about 80%, and preferably from about 60 to about 70%, by volume of the composite. Considered individually, conductive particles may comprise from about 20 to about 60%, preferably from about 25 to about 40%, by volume of the composite; and semiconductive particles may comprise from about 10 to about 65%, preferably from about 20 to about 50%, by volume of the composite The insulative components of the composite, i.e. the binder and the insulative separating particles, may comprise from about 20% to about 45%, preferably from about 30 to about 40%, by volume of the composite. The insulative separating particles are most preferably about 1% by volume of the composite, although they may be a few percent, and for special purposes up to as much as about 5% by volume. These composite composition parameters are depicted in the three-coordinate triangular graph of FIG. 1.

As explained above, it is believed that the maximum benefits of the invention are obtained by use of a minimum percent of insulative particles and matrix binder, consistent with obtaining the desired angstrom range separation of conductor/semiconductor particles and securing the composite in a stable coherent body. At the present time, extremely good results are experienced with approximately 30% by volume of binder, and 1% by volume of 100 angstrom range insulative particles.

The presently preferred conductor particulate material utilized in the practice of the present invention are nickel powders and boron carbide powders. For most composites, it is preferred to use a mixture of two different forms of nickel: the first is a carbonyl nickel, reduced by ball milling in large measure to its ultimate particles of highly structured (i.e. irregular angular shape) balls of about 2–3 microns; the second is a spherical nickel ranging in size between 40 and 150 microns. The carbonyl nickel used is from Atlantic Equipment Engineers, marketed as Ni228, and the larger nickel particles ate from the same company, marketed as Ni227. The boron carbide used is one supplied by Fusco Abrasive, and has a median particle size of about 0.9 micron.

Obviously, numerous other conductive particle materials can be used with, or in place of the preferred materials, it being desirable and important for optimum results, however, to provide a proper distribution of particle sizes in the composite in order to obtain the dense particulate packing described above. Among the conductive materials that may be employed are carbides of tantalum, titanium, tungsten and zirconium, carbon black, graphite, copper, aluminum, molybdenum, silver, gold, zinc, brass, cadmium, bronze, iron, tin beryllium, and lead. As stated above, it is important that these conductive particles be free of insulative or high resistance surface oxides, or the like, for purposes of the present invention. Accordingly, for some of the more reactive materials it may be necessary to specially remove oxide coatings, and to keep the particles under a protective atmosphere until formulated in the composite.

The presently preferred semiconductor particulate material utilized in the practice of the present invention is silicon carbide. In addition, zinc oxide in combination with bismuth oxide has been used in place of the silicon carbide. The silicon carbide used in the practice of the invention is Sika grade, polyhedral or "blocky" in form, with a particle size range of about 1 to 3 microns, supplied by Fusco Abrasive, Inc. The zinc oxide and bismuth oxide were obtained form Morton Thiokol, Inc. and had particle sizes, for zinc oxide, in the range of 0.5 to 2 microns, and for bismuth oxide, about 1 micron.

Obviously, numerous other semiconductor particulate materials can be used with, or in place of the preferred materials, it being desirable and important for optimum results, however, to provide a proper distribution of particle sizes in the composite in order to obtain the dense particulate packing described above. Among the semiconductor materials that may be employed are the oxides of calcium, niobium, vanadium, iron and titanium, the carbides of beryllium, boron and vanadium, the sulfides of lead, cadmium, zinc and silver, silicon, indium antimonide, selenium, lead telluride, boron, tellurium, and germanium.

The preferred insulative spacing particle is a fumed colloidal silica, marketed as Cab-O-Sil by Cabot Corporation. Cab-O-Sil is a chain of highly structured balls approximately 20–100 angstroms in diameter.

One binder or matrix material that has been used is a silicone rubber marketed by General Electric Company as SE63, cured with a peroxide catalyst, as for example Varox. Obviously, other insulating thermosetting and thermoplastic resins can be used, various epoxy resins being most suitable. It is desired that the binder resistivity range from about $10^{12}$ to about $10^{15}$ ohms per cm.

The composites of the present invention are preferably compounded and formulated in the following manner, described with reference to the above-identified preferred ingredients. Initially, the two nickel components are ball milled individually for two purposes—first, to remove oxide films from their surfaces, and second, to break up any agglomerates and reduce the nickel powders essentially to their ultimate particle sizes, particularly the carbonyl nickel (Ni228) which otherwise exists as highly structured balls agglomerated into long chains several hundred microns long. The two nickel powders are then ball milled together (if two nickel powders are used) to distribute the smaller micron sized carbonyl nickel particles uniformly over the surfaces of the much larger (100 micron range) nickel particles (Ni227). In so doing, the smaller structured nickel particles tend to adhere to, or embed in the surface of the larger nickel particles. Then, the boron carbide, colloidal silica and semiconductor particulate are combined with the nickel by hand mixing. The prepolymer matrix or binder material is introduced first into a mixer—preferably, for example, a C. W. Brabender Plasticorder mixer, with a PLD 331 mixing head, which provides a relatively slow speed, high shear (greater than 1500 meter-grams) kneading or folding type of mixing action to expell all air. While the mixer is operating, the entire premixed powder or particulate charge is added gradually. Then, the mixer is operated until the mixing torque curve asymptotically drops to a stable level, indicating that essentially complete homogeneity of the mix has been obtained. the Varox or other curing catalyst is then added and thoroughly mixed into the composite. Whereupon, the composite is ready for molding, extruding or other forming operation, as appropriate.

In the foregoing procedure, there is no preferential coating of any of the particulate components with the colloidal silica; the silica is merely distributed throughout the mix. The close packing of the particulate materials results from several factors: 1. the use of a minimum proportion of binder or matrix material; 2. the proportions of different sized particulates adapted to fill the voids between an array of essentially contiguous larger particles with smaller particles; and 3. the mixing by high shear kneading action, continued sufficiently to produce an essentially homogeneous composite, whereby the proportioned size distribution of particles is forced to occupy the minimum volume of which it is capable. The resultant composite material obtains a density of only 1 or 2% less than the theoretical density for the ingredients employed.

Figure 2:
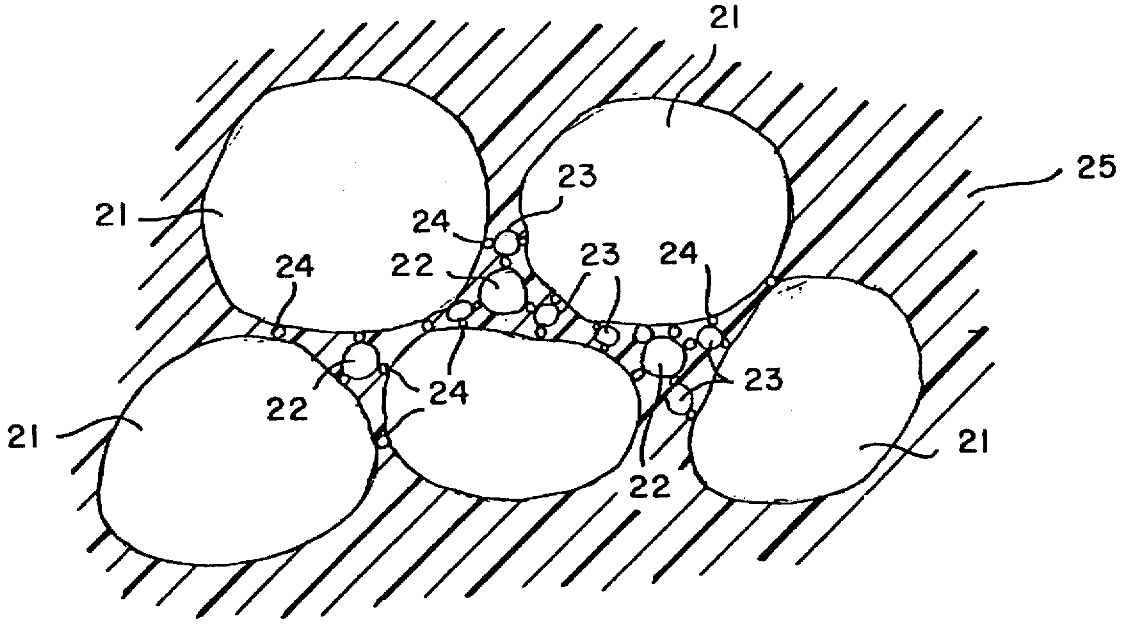
FIG. 2 is an enlarged and idealized schematic depiction of the particulate relationship and binder matrix of the composite in accordance with the present invention.

An idealized illustration of the composite structure is depicted at FIG. 2. The largest particles are designated by the numeral 21, and represent the 100 micron range nickel particles. In some instances adjacent points are separated by the 100 angstrom range colloidal silica particles 24. The larger voids between contiguous particles 21 contain the next smaller particles, the micron range particles 22, e.g. the carbonyl nickel, the bismuth oxide, and/or the silicon carbide particles. The smaller voids contain the submicron range particles, such as the boron carbide and the zinc oxide particles, depicted by numeral 23. Interposed and separating many of the aforesaid conductor/semiconductor particles are the colloidal silica particles 24. The remainder of the voids is filled with the matrix resin binder. As stated, the depiction in FIG. 2 is idealized, and it is simplified. To facilitate the illustration, the voids between particles 21 are left somewhat open and are not shown loaded with micron and submicron particles. Also, statistically it is apparent that some proportion of conductor/semiconductor particles will be in conductive contact with each other; but with a large number of particles occupying a relatively large volume compared to the sizes of the particles, it is apparent that there will be frequent insulative particle interruptions, and the conductive chains of particles will be relatively short in relation to the macro system as a whole.

Figure 3:
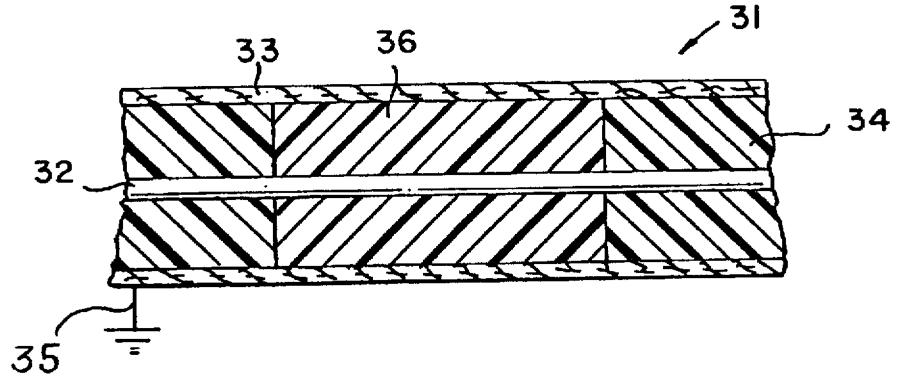
FIG. 3 is a schematic depiction illustrative of the use of the composite of the present invention.

An illustrative use of the composite material is depicted in FIG. 3. A section of a coaxial cable 31 is shown, containing a center conductor 32, a dielectric 34 surrounding the conductor 32, and a conductive braided sleeve 33 overlying the dielectric 34. The braided sleeve is grounded, as indicated at 35. A small segment of the dielectric 34 is replaced by the section 36 formed from the composite of the present invention, and secure electrical contact is maintained between the conductor 32 and the composite, and between the braid 33 and the composite. Under normal working conditions, the composite 36 presents a very high resistance from the conductor 32 to the braid 33, and therefore signals on conductor 32 are essentially unaffected. However, if a high voltage overstress pulse appears on conductor 32, its presence will immediately switch composite 36 to the on-state, thereby immediately shunting the pulse to ground and clamping the pulse at a low voltage value, to protect the circuit or device to which the cable is connected.

In order to illustrate the present invention, further, the following specific examples are provided, showing specific illustrative composite formulations and the electrical properties thereof, specifically the response to an overstress pulse and the normal operating resistance.

EXAMPLES 1-3

| | Vol. Percent | | |
|---|---|---|---|
| | Ex. 1 | Ex. 2 | Ex. 3 |
| Formulation | | | |
| Carbonyl nickel (Ni228) (micron range) | 7.8 | 9.0 | — |
| Nickel (Ni227) (100 micron range) | 23.5 | 27.0 | 36.0 |
| Silicon Carbide (micron range) | 9.5 | — | — |
| Boron carbide (submicron range) | 21.7 | 10.0 | 3.0 |
| Zinc oxide (submicron range) | — | 19.6 | 28.3 |
| Bismuth oxide (micron range) | — | 1.3 | 1.6 |
| Colloidal silica (20 to 100 angstrom range) | 4.8 | 1.0 | 1.0 |
| Silicone rubber binder (SE63) | 32.6 | 32.0 | 30.0 |
| Actual density | 4.05 | 4.98 | 5.28 |
| Theoretical density | 4.06 | 5.01 | 5.34 |

-continued

| | Vol. Percent | | |
|---|---|---|---|
| | Ex. 1 | Ex. 2 | Ex. 3 |
| Electrical Characteristics | | | |
| Thickness of sample (mils) | 55 | 50 | 180 |
| Overstress pulse (volts) | 4800 | 4800 | 4800 |
| Clamping value (volts) at time from leading edge of pulse | | | |
| 0 nanoseconds | 458 | 280 | 385 |
| 50 nanoseconds | 438 | 263 | 376 |
| 100 nanoseconds | 428 | 237 | 372 |
| 500 nanoseconds | 405 | 228 | 350 |
| 1.0 microseconds | 405 | 222 | 350 |
| 2.0 microseconds | 400 | 228 | 350 |
| 3.0 microseconds | 396 | 228 | 340 |
| Resistance in megohms at 10 volts | 2.2 | 1.7 | 3.5 |

From the foregoing examples it will be appreciated that an electrical overstress protection device can be provided, wherein an overstress pulse of thousands of volts is clamped essentially instantaneously to values of a few hundred volts, and maintained at that value. Further, the normal operating resistance value of the overstress responsive device is in the megohm range. Obviously, by varying the components and proportions of the composite material within the principles and concepts of the invention, the values of the electrical parameters can be altered and tailored to the needs of a specific environment, system or purpose.

By way of comparison, reference is made to the materials in the above-mentioned prior art patent to Hyatt et al. 4,726,991. Therein, two specific composite compositions are set forth at col. 9, lines 20 to 24. The components of the composite are there specified in weight percent. For comparison purposes they are here converted to volume percent.

EXAMPLES 4 and 5

| | Ex. 4 | | Ex. 5 | |
|---|---|---|---|---|
| Composition | Wt. % | Vol. % | Wt. % | Vol. % |
| Carbonyl nickel | 12 | 3.2 | 22.5 | 6.1 |
| Silicon Carbide | 56 | 40.6 | 43 | 32 |
| Colloidal silica | 2 | 2.1 | 2.5 | 2.7 |
| Epoxy binder | 30 | 53.9 | 32 | 59.2 |

It will be immediately apparent that the prior art composites use a much greater percent of insulation material (binder plus colloidal silica), and a much lesser volume percent of conductor particles, than is used in the practice of the present invention. Although not stated in the patent, these compositions in the prior patent provide excessively high clamping voltages, in excess of 1800 volts per millimeter of thickness of composite material.

Referring to FIG. 5 of said Hyatt et al. patent, while it depicts an overstress clamping voltage of less than 200 volts for a composite material, what is not stated in the patent is that this result was not obtained with the composites described above at Examples 4 and 5, and that the resistance of the FIG. 5 material in response to a normal operating voltage of 10 or 20 volts, or so, was less than 20,000 ohms.

It will thus be appreciated that in accordance with the teachings of the present invention, a composite of particulate components in a binder matrix is provided, which is capable of providing a high resistance at relatively low operating voltages, and a low impedance in response to a high voltage electrical overstress pulse to clamp the overstress pulse at a low voltage. The specific low voltage resistance and overstress clamping voltage can be varied and tailored to a specific need by appropriate selection of the composite ingredients and proportions. Accordingly, while the invention is described herein with reference to several specific examples and specific procedures, these are presented merely as illustrative and as preferred embodiments of the invention at this time. Modifications and variations will be apparent to those skilled in the art, and such as are within the spirit and scope of the appended claims, are contemplated as being within the purview of the present invention.

What is claimed is:

1. A material for placement between and in contact with spaced conductors to provide a non-linear resistance therebetween, said material comprising a matrix formed of a binder and only closely spaced conductive particles:

(a) said closely spaced conductive particles being homogeneously distributed, said particles being in the submicron range to hundred micron range in size and spaced by said binder to provide electrical conduction by quantum-mechanical tunneling therebetween; and (b) said binder selected to provide the quantum-mechanical tunneling media between said conductive particles and predetermined resistance between said conductive particles in the absence of quantum-mechanical tunneling.

2. A material as set forth in claim 1, wherein said spacing of said particles is in the range of about 20 to 200 angstroms.

3. A material as set forth in claim 2, and further including fumed silicon dioxide.

4. A material as set forth in claim 1, and further including fumed silicon dioxide.

5. A device utilizing materials as set forth in claim 1, to provide nanosecond transient overvoltage protection to electronic circuitry.

6. A material as set forth in claim 1, and further including powdered semiconductors.

7. A material as set forth in claim 2, and further including powdered semiconductors.

* * * * *